United States Patent
Kuo et al.

(10) Patent No.: US 10,455,778 B2
(45) Date of Patent: Oct. 29, 2019

(54) **METHOD FOR CULTIVATING *CORDYCEPS MILITARIS* FRUITING BODY**

(71) Applicant: Food Industry Research and Development Institute, Hsinchu (TW)

(72) Inventors: Hsiao-Ping Kuo, Hsinchu (TW); Yi-Sheng Lin, Hsinchu (TW); Shyue-Tsong Huang, Hsinchu (TW); An-Chi Wu, Hsinchu (TW); Jinn-Tsyy Lai, Hsinchu (TW)

(73) Assignee: FOOD INDUSTRY RESEARCH AND DEVELOPMENT INSTITUTE, Hsinchu (TW)

(*) Notice: Subject to any disclaimer, the term of this patent is extended or adjusted under 35 U.S.C. 154(b) by 222 days.

(21) Appl. No.: 15/706,810

(22) Filed: Sep. 18, 2017

(65) Prior Publication Data
US 2019/0053438 A1  Feb. 21, 2019

(30) Foreign Application Priority Data
Aug. 17, 2017 (TW) .............................. 106128000 A

(51) Int. Cl.
*A01G 18/00* (2018.01)
*A23F 3/16* (2006.01)

(52) U.S. Cl.
CPC .............. *A01G 18/00* (2018.02); *A23F 3/163* (2013.01)

(58) Field of Classification Search
CPC .......... A01G 1/04; A01G 18/00; A01G 18/20; A01G 18/50; A01G 18/61; A23F 3/163
USPC ........................................... 47/1.1; 435/254.1
See application file for complete search history.

(56) References Cited

U.S. PATENT DOCUMENTS

| | | | | |
|---|---|---|---|---|
| 7,122,176 | B2 * | 10/2006 | Stamets ................ | A01N 63/04 424/84 |
| 2011/0182862 | A1 * | 7/2011 | Green .................... | A01N 63/04 424/93.5 |
| 2013/0224315 | A1 * | 8/2013 | Green .................... | A01N 27/00 424/725 |
| 2014/0302560 | A1 * | 10/2014 | Kelly ...................... | C12N 1/14 435/71.1 |
| 2015/0305249 | A1 * | 10/2015 | Miller .................... | A01G 18/00 47/1.1 |

FOREIGN PATENT DOCUMENTS

| | | | | |
|---|---|---|---|---|
| CN | 103461608 A | * | 12/2013 | ............... A23F 3/34 |
| CN | 105941743 A | * | 5/2016 | ............. A01G 18/00 |

* cited by examiner

*Primary Examiner* — David J Parsley
*Assistant Examiner* — Danielle A Clerkley
(74) *Attorney, Agent, or Firm* — Bacon & Thomas, PLLC

(57) ABSTRACT

A method for cultivating *Cordyceps militaris* fruiting body capable of improving *C. militaris* fruiting body morphology is provided, wherein rice absorbed with a tea liquid is used as a solid-state culture medium. In comparison to using rice absorbed with water as a solid-state culture medium, the *C. militaris* fruiting body cultivated by using the solid-state culture medium of the present invention under the same cultivation condition are significantly more robust.

14 Claims, 3 Drawing Sheets

METHOD FOR CULTIVATING *CORDYCEPS MILITARIS* FRUITING BODY

BACKGROUND OF THE INVENTION a) Field of the Invention

The present invention relates to a method for cultivating *Cordyceps militaris* fruiting body, and more particularly to a method for cultivating *C. militaris* fruiting body capable of improving *C. militaris* fruiting body morphology.

b) Description of the Prior Art

Taiwan patent publication TW200600006 discloses a method for cultivating *C. militaris* fruiting body, comprising: providing *C. militaris*; freely pairing *C. militaris*; cultivating the paired *C. militaris* on a solid-state culture medium; moving the cultivated *C. militaris* into a liquid-state culture medium for cultivation; obtaining *C. militaris* mycelia; cultivating the *C. militaris* mycelia away from light on a culture medium having rice; cultivating the *C. militaris* mycelia under light; and obtaining a *C. militaris* fruiting body. Thus, a method for rapidly and massively reproducing *C. militaris* fruiting body is provided. However, the application did not mention the morphology of the *C. militaris* fruiting body, and did not discuss about how to improve the morphology of the obtained *C. militaris* fruiting body.

Taiwan patent publication TW201404880 discloses a method of using tea leaves as a substrate for cultivating *C. militaris* and a product thereof, and the method comprises the steps of: a step of tea leaf fixation procedure; a step of making a tea liquid culture medium; a step of inoculating tea leaves in the tea fluid culture medium with *C. militaris* mycelia; and a step of cultivating and growing the *C. militaris* mycelia, thereby obtaining *C. militaris*, tea leaves and a tea enriched in active substances. The main content of the patent application investigates changes in the growth area of the *C. militaris* mycelia by adding sugar in the tea liquid culture medium, and changes in the concentration of active substances secreted and released by *C. militaris* into the tea by adding sugar or skim milk to the tea liquid culture medium, so as to obtain a drinkable tea enriched in active substances. And yet the application has not mentioned the morphology of *C. militaris* fruiting body.

SUMMARY OF THE INVENTION

A primary objective of the present invention is to provide a method for cultivating *C. militaris* fruiting body which is capable of improving *C. militaris* fruiting body morphology, that is, the *C. militaris* fruiting body cultivated by using the method of the present invention is relatively more robust.

To achieve the aforesaid objective of the present invention, a new solid-state culture medium is used to cultivate *C. militaris* fruiting body, and the solid-state culture medium comprises rice absorbed with a tea liquid. In comparison with using rice absorbed with water as a solid-state culture medium, the *C. militaris* fruiting body cultivated by using the solid-state culture medium having the rice absorbed with a tea liquid of the present invention under the same cultivation condition are significantly more robust.

To enable a further understanding of the invention herein, a brief description of the drawings below is followed by a detailed description of the preferred embodiments.

DETAILED DESCRIPTION OF THE PREFERRED EMBODIMENTS

Figure 1:
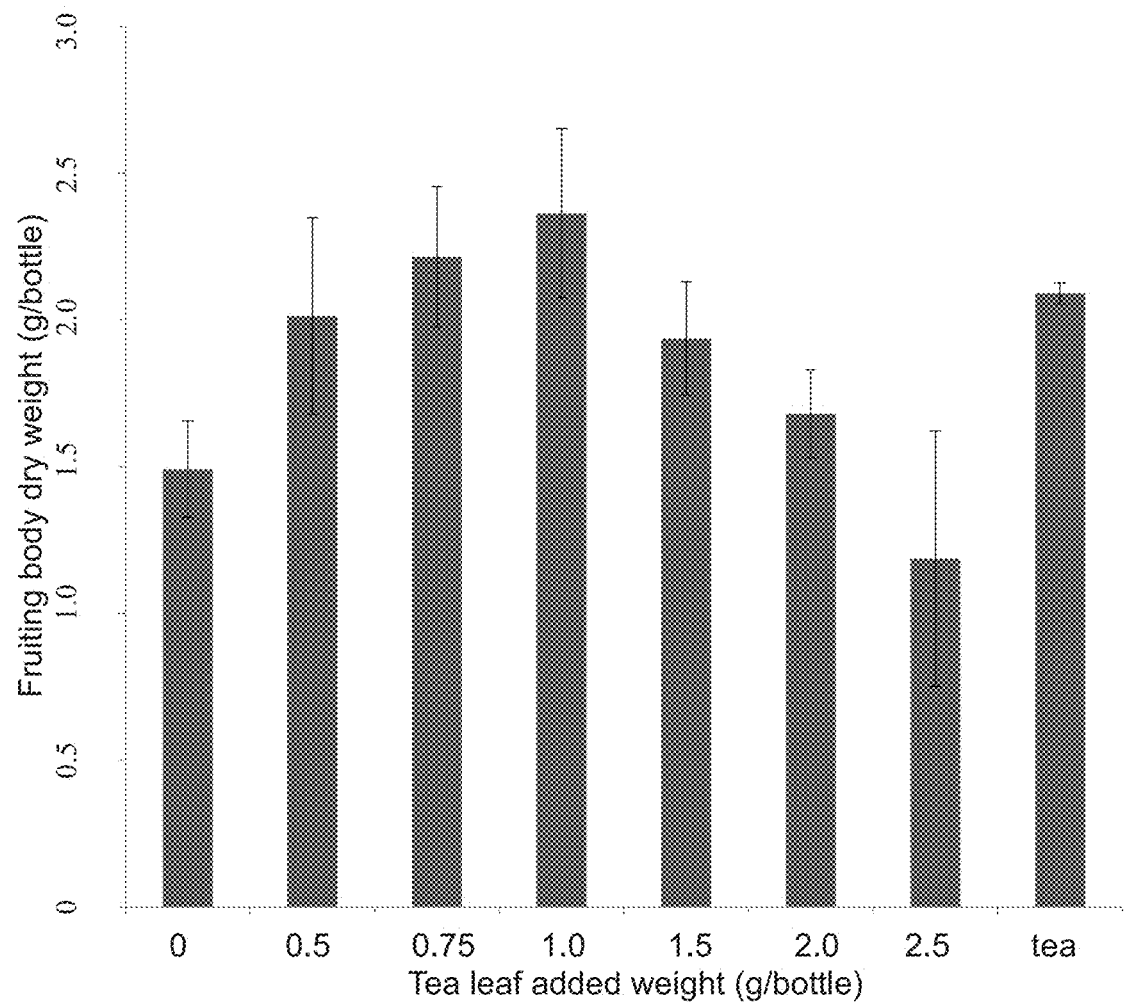
FIG. 1 shows the dry weights of *C. militaris* fruiting bodies obtained by using one same strain, and 30 g of rice respectively added with RO water, RO water and 0.5 g of tea leaves, RO water and 0.75 g of tea leaves, RO water and 1.0 g of tea leaves, RO water and 1.5 g of tea leaves, RO water and 2.0 g of tea leaves, RO water and 2.5 g of tea leaves; and tea.

The present invention provides a method for cultivating *C. militaris* fruiting body, comprising:

a) providing a seed source being activated *C. militaris* spores or *C. militaris* mycelia;

b) providing a solid-state culture medium, wherein the solid-state culture medium comprises rice;

c) inoculating the rice of the solid-state culture medium of step b) with the seed source of step a), and cultivating the same until a fruiting body of *C. militaris* is formed;

characterized in that:

the rice of the solid-state culture medium of step b) has absorbed with tea.

Preferably, the solid-state culture medium of step b) is provided by a method comprising the steps of:

1) sequentially adding tea leaves, rice and water into a container, wherein a dry weight ratio between the tea leaves and the rice is 0.5:30 to 3:30, and a weight ratio of a total dry weight of the tea leaves and the rice to water is 1:1 to 1:0.5; and 2) sterilizing tea leaves, rice and water in the container.

More preferably, the tea leaves and the rice in the container are naturally distributed.

Preferably, the solid-state culture medium of step b) is provided by a method comprising the steps of:

i) mixing tea leaves and water;

ii) performing solid-liquid separation on the mixture of step i) to obtain a tea liquid;

iii) mixing rice with the tea liquid of step ii), and sterilizing the resulting mixture of rice and tea liquid, wherein a dry weight ratio between the tea leaves and the rice is 0.5:30 to 3:30, and a weight ratio of a total dry weight of the tea leaves and the rice to water is 1:1 to 1:0.5.

Preferably, the water of step i) is hot water having a temperature between 45-99° C., and a mixing time of the tea leaves and the water is between 1 minute to 1 hour.

Preferably, the water of step i) is water having a temperature between 5° C. to room temperature, and a mixing time of the tea leaves and the water is between 0.5 hour to 48 hours.

Preferably, the tea leaves can be an unfermented tea, a semi-fermented tea or a fermented tea, and more preferably the tea is the unfermented tea.

Preferably, the rice can be brown rice, germ rice or white rice, and more preferably the rice is white rice.

EXPERIMENT

Materials

Reagents and culture media: PDB (potato dextrose broth) purchased from BD (Becton Dickinson and Company, NJ, USA). Polished round-grained rice (water content 14.2 wt %, purchased from Chishang Rice Crops Vendor, Taitung, Taiwan). Tea leaves from Tea Research and Extension Station, Council of Agriculture, Executive Yuan (unfermented tea, water content 3.7 wt %).

Instruments: an electronic scale, a −80° C. ultra-low temperature upright freezer, an illumination incubator, a 25° C. incubator and a freeze dryer.

METHODS (1) Inoculum culture solution:

A PDB culture medium (potato starch 4 g/L, dextrose 20 WO was inoculated with 1% of a preservation liquid ($10^8$ spores/mL) of −80° C. frozen spores, and incubated at 25° C. for 5-7 days in a shaking incubator (150 rpm) to obtain a seed source for solid-state cultivation.

(2) *C. militaris* solid-state cultivation:

30 g of rice was obtained and had RC water added thereto according to a solid-liquid weight ratio of 1:0.8, and placed into 450 mL glass flasks already added with different amounts of tea leaves (0.5-5 g), and then put on lids for performing autoclaving (121° C., 15 minutes). After cooling, 15 mL of the aforesaid inoculum culture solution was taken for inoculating the autoclaved solid-state culture media, and the environmental condition was set for two-step cultivation:

a. cultivation away from light: temperature 25±3° C./7 days.

b. cultivation under light: temperature 23±3° C., illumination intensity 500-1500 lux, illuminated time 10 hours/unilluminated time 14 hours alternated. The cultivation was performed for 2 months and followed by harvesting and freeze-drying of fruiting bodies, and the production of the fruiting bodies was recorded (g/bottle).

Preparation of tea: 1 g of tea leaves was added into 24 mL of 90° C. hot water, and the resulting mixture was stirred for 20 minutes before removing the tea leaves and keeping the tea, and then substituted the tea for the aforesaid RO water, and repeated the above-mentioned steps of solid-state cultivation of *C. militaris*.

(3) Measurement of the size of fruiting body: after harvesting the fruiting bodies, a ruler was used to measure a length and a top width of each of the harvested fruiting bodies, and then counted and analyzed differences therebetween after recording.

(4) Strain testing: two different strains were respectively tested to evaluate whether the addition of tea leaves or tea into the solid-state culture media had any effects on the morphology of fruiting bodies of different strains of *C. militaris*.

RESULT

The *C. militaris* fruiting bodies obtained by respectively adding 0.5 g, 0.75 g, 1.0 g, 1.5 g, 2.0 g, 2.5 g, 3.0 g, 4.0 g and 5.0 g of tea leaves to 30 g of rice show that when the added weight of tea leaves was increased from 0 to 1.0 g, the lengths, the widths and the dry weights of the obtained *C. militaris* fruiting bodies gradually increased as well. But when the added weight of tea leaves was increased from 1.0 to 5.0 g, the lengths, the widths and the dry weights of the obtained *C. militaris* fruiting bodies did not increase further, or even declined.

FIG. 1 shows the dry weights of *C. militaris* fruiting bodies obtained by using one same strain, and had 30 g of rice respectively added with RO water, RO water and 0.5 g of tea leaves, RO water and 0.75 g of tea leaves, RO water and 1.0 g of tea leaves, RO water and 1.5 g of tea leaves, RO water and 2.0 g of tea leaves, RO water and 2.5 g of tea leaves, and tea.

Figure 2:
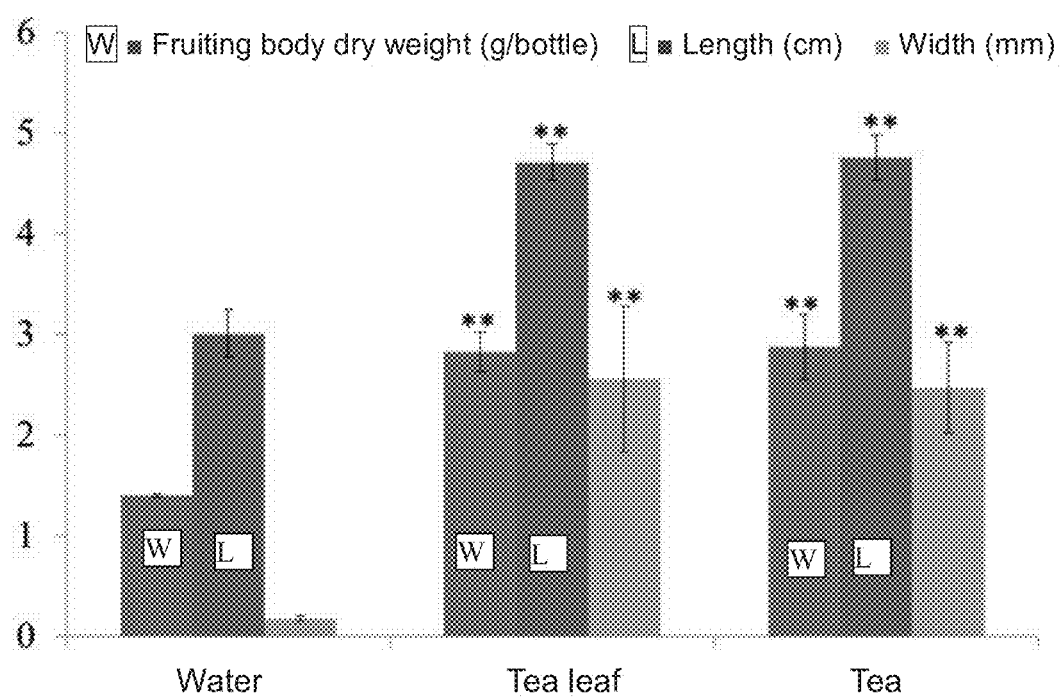
FIG. 2 shows the lengths, the widths and the dry weights of *C. militaris* fruiting bodies obtained by using one same strain, and 30 g of rice respectively added with RO water, RO water and 1.0 g of tea leaves, and tea.

FIG. 2 shows the lengths, the widths and the dry weights of *C. militaris* fruiting bodies obtained by using one same strain, and had 30 g of rice respectively added with RO water, RO water and 1.0 g of tea leaves, and tea.

It can be noted from FIG. 1 that the dry weight of fruiting bodies (2.36±0.29 g/bottle) reaches the highest when the added weight of tea leaves is 1 g/bottle. When the added weight of tea leaves is 2.5 g/bottle, the dry weight of fruiting bodies is lower than the control group in which the solid-state culture medium only added with RO water was used. It can be observed from FIG. 2 that the solid culture medium prepared by using tea to replace RO water has the equivalent experimental outcome of using the solid culture medium having 1.0 g of tea leaves added to 30 g of rice, and the lengths, the widths and the dry weights of *C. militaris* fruiting bodies obtained from the two experimental groups are approximately the same.

Figure 3:
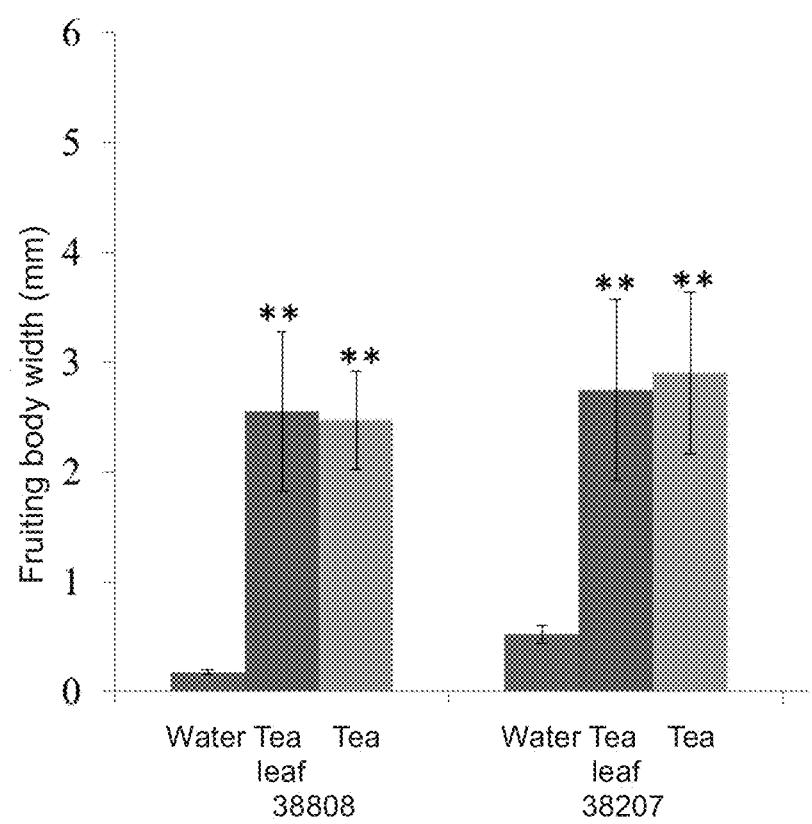
FIG. 3 shows the widths (mm) of *C. militaris* fruiting bodies obtained by using two different strains, coded 38207 and 38808, and 30 g of rice respectively added with RO water, RO water and 1.0 g of tea leaves, and tea.

FIG. 3 shows the widths (mm) of *C. militaris* fruiting bodies obtained by using two different strains of *C. militaris*, coded 38207 and 38808, and had 30 g of rice respectively added with RO water, RO water and 1.0 g of tea leaves, and tea. It can be observed from FIG. 3 that with respect to the two different strains of *C. militaris* coded 38207 and 38808, the *C. militaris* fruiting bodies cultivated according to the method of the present invention have approximately the same levels of increase in their widths in comparison to the control group.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A method for cultivating *Cordyceps militaris* fruiting body, comprising:
    a) providing a seed source, and the seed source being activated *C. militaris* spores or *C. militaris* mycelia;
    b) providing a solid-state culture medium, wherein the solid-state culture medium comprises rice;
    c) inoculating the rice of the solid-state culture medium of step b) with the seed source of step a), and cultivating the solid-state culture medium inoculated with the seed source until a fruiting body of *C. militaris* is formed;
    characterized in that: the rice of the solid-state culture medium of step b) is absorbed with a tea liquid.

2. The method of claim 1, wherein the solid-state culture medium of step b) is provided by a method comprising the steps of:
    1) sequentially adding tea leaves, rice and water into a container, wherein a dry weight ratio between the tea leaves and the rice is 0.5:30 to 3:30, and a weight ratio of a total dry weight of the tea leaves and the rice to the water is 1:1 to 1:0.5; and
    2) sterilizing the tea leaves, the rice and the water in the container.

3. The method of claim 2, wherein the tea leaves comprises an unfermented tea, a semi-fermented tea or a fermented tea.

4. The method of claim 3, wherein the tea leaves is an unfermented tea.

5. The method of claim 2, wherein the tea leaves and the rice added into the container are naturally distributed.

6. The method of claim 1, wherein the solid-state culture medium of step b) is provided by a method comprising the steps of:
  i) mixing tea leaves and water;
  ii) performing solid-liquid separation on the mixture of step i) to obtain a tea liquid;
  iii) mixing rice with the tea liquid of step ii), and sterilizing the resulting mixture of the rice and the tea liquid,
  wherein a dry weight ratio between the tea leaves and the rice is 0.5:30 to 3:30, and a weight ratio of a total dry weight of the tea leaves and the rice to the water is 1:1 to 1:0.5.

7. The method of claim 6, wherein the tea leaves comprises an unfermented tea, a semi-fermented tea or a fermented tea.

8. The method of claim 7, wherein the tea leaves is an unfermented tea.

9. The method of claim 6, wherein the water of step i) is hot water having a temperature between 45-99° C., and a mixing time of the tea leaves and the water is between 1 minute to 1 hour.

10. The method of claim 6, wherein the water of step i) is water having a temperature between 5° C. to room temperature, and a mixing time of the tea leaves and the water is between 0.5 hour to 48 hours.

11. The method of claim 1, wherein the rice comprises brown rice, germ rice or white rice.

12. The method of claim 11, wherein the rice is white rice.

13. The method of claim 1, wherein the seed source of step a) is activated *C. militaris* spores.

14. The method of claim 1, wherein the seed source of step a) is activated *C. militaris* mycelia.

* * * * *